United States Patent
Joseph

(10) Patent No.: US 7,744,020 B2
(45) Date of Patent: *Jun. 29, 2010

(54) FUEL INJECTOR INCLUDING AN ORIFICE DISC, AND A METHOD OF FORMING THE ORIFICE DISC INCLUDING PUNCHING AND SHAVING

(75) Inventor: J. Michael Joseph, Newport News, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1660 days.

This patent is subject to a terminal disclaimer.

(21) Appl. No.: 10/622,567

(22) Filed: Jul. 21, 2003

(65) Prior Publication Data

US 2005/0017098 A1    Jan. 27, 2005

(51) Int. Cl.
*F02M 61/00*   (2006.01)

(52) U.S. Cl. ............... 239/533.12; 239/518; 239/585.5

(58) Field of Classification Search ............ 239/533.12, 239/601, 499, 500, 504, 518, 585.1, 585.4, 239/585.5, 900

See application file for complete search history.

(56) References Cited

U.S. PATENT DOCUMENTS

| | | |
|---|---|---|
| 335,334 A | 2/1886 | Brady |
| 600,687 A | 3/1898 | Flemming |
| 2,737,831 A | 3/1956 | Webb |
| 2,846,902 A | 8/1958 | Cowley |
| 4,072,039 A | 2/1978 | Nakanishi |
| 4,923,169 A | 5/1990 | Grieb et al. |
| 4,970,926 A | 11/1990 | Ghajar et al. |
| 5,002,231 A | 3/1991 | Reiter et al. |
| 5,201,806 A | 4/1993 | Wood |
| 5,335,864 A | 8/1994 | Romann et al. |
| 5,344,081 A | 9/1994 | Wakeman |
| 5,365,819 A | 11/1994 | Maida et al. |
| 5,489,065 A | 2/1996 | Nally, Jr. |
| 5,553,397 A | 9/1996 | Schwitzky et al. |
| 5,636,796 A | 6/1997 | Oguma |

(Continued)

FOREIGN PATENT DOCUMENTS

JP    52-32192    3/1977

(Continued)

OTHER PUBLICATIONS

PCT International Search Report (PCT/US 2004/019505) Mailed Nov. 15, 2004.

*Primary Examiner*—Christopher S Kim

(57) ABSTRACT

A fuel injector includes a seat, a movable member cooperating with the seat, and an orifice plate. The orifice plate includes a member and an orifice penetrating the member. The member includes first and second generally parallel surfaces. The first surface generally confronts the valve seat, and the second surface faces opposite the first surface. The orifice is defined by a wall that couples the first and second surfaces. The wall includes a first portion that extends from the first surface and a second portion extending between the first portion and the second surface. The first portion of the wall extends at a first oblique angle with respect to the first surface, and the first oblique angle varies so as to define an asymmetrical chamfer. The second portion of the wall defines a cylinder extending along an axis at a second oblique angle with respect to the second surface.

8 Claims, 4 Drawing Sheets

U.S. PATENT DOCUMENTS

| | | |
|---|---|---|
| 5,697,154 A | 12/1997 | Ogihara |
| 5,746,376 A | 5/1998 | Romann et al. |
| 5,816,093 A | 10/1998 | Takeuchi et al. |
| 5,931,391 A | 8/1999 | Tani et al. |
| 6,009,787 A | 1/2000 | Hänggi |
| 6,039,271 A | 3/2000 | Reiter |
| 6,070,812 A | 6/2000 | Tani et al. |
| 6,089,476 A | 7/2000 | Sugimoto et al. |
| 6,131,826 A | 10/2000 | Teiwes |
| 6,131,827 A | 10/2000 | Kurita et al. ............. 239/533.2 |
| 6,929,196 B2 * | 8/2005 | Togashi et al. ......... 239/533.14 |
| 6,948,665 B2 * | 9/2005 | Joseph .................... 239/533.2 |
| 2002/0038825 A1 | 4/2002 | Takeshita et al. ......... 239/585.1 |

FOREIGN PATENT DOCUMENTS

| | | |
|---|---|---|
| JP | 59-223121 | 12/1984 |
| JP | 60-137529 | 7/1985 |

* cited by examiner

FUEL INJECTOR INCLUDING AN ORIFICE DISC, AND A METHOD OF FORMING THE ORIFICE DISC INCLUDING PUNCHING AND SHAVING

FIELD OF INVENTION

This invention relates generally to electrically operated fuel injectors of the type that inject volatile liquid fuel into an automotive vehicle internal combustion engine, and in particular the invention relates to a novel thin disc orifice member for such a fuel injector.

BACKGROUND OF THE INVENTION

It is believed that contemporary fuel injectors must be designed to accommodate a particular engine, not vice versa. The ability to meet stringent tailpipe emission standards for mass-produced automotive vehicles is at least in part attributable to the ability to assure consistency in metering, atomizing, shaping and aiming the injection spray or stream, e.g., toward intake valve(s) or into a combustion cylinder. Wall wetting should be avoided.

Because of the large number of different engine models that use multi-point fuel injectors, a large number of unique injectors are needed to provide the desired shaping and aiming of the injection spray or stream for each cylinder of an engine. To accommodate these demands, fuel injectors have heretofore been designed to produce straight streams, bent streams, split streams, and split/bent streams. In fuel injectors utilizing thin disc orifice members, such injection patterns can be created solely by the specific design of the thin disc orifice member.

This capability offers the opportunity for meaningful manufacturing economies since other components of the fuel injector are not necessarily required to have a unique design for a particular application, i.e. many other components can be of common design.

Another concern in contemporary fuel injector design is minimizing the so-called "sac volume." As it is used in this disclosure, sac volume is defined as the volume downstream of a needle/seat sealing perimeter and upstream of the orifice hole(s). The practical limit of dimpling a geometric shaped into an orifice disc pre-conditioned with straight orifice holes is the depth or altitude of the geometric shape required to obtain the desired spray angle(s). Obtaining the larger bend and split spray angles makes the manufacture more difficult and increases sac volume at the same time. At the same time, as the depth of the geometry increases, the amount of individual hole and dimple distortion also increases. In extreme instances, the disc material may shear between holes or at creases in the geometrical dimple.

SUMMARY OF THE INVENTION

The present invention provides a fuel injector for spray targeting fuel. The fuel injector includes a seat, a movable member cooperating with the seat, and an orifice plate. The seat includes a passage that extends along a longitudinal axis, and the movable member cooperates with the seat to permit and prevent a flow of fuel through the passage. The orifice plate includes a member and an orifice penetrating the member. The member includes first and second generally parallel surfaces. The first surface generally confronts the valve seat, and the second surface faces opposite the first surface. The orifice is defined by a wall that couples the first and second surfaces. The wall includes a first portion that extends from the first surface and a second portion extending between the first portion and the second surface. The first portion of the wall extends at a first oblique angle with respect to the first surface, and the first oblique angle varies so as to define an asymmetrical chamfer. The second portion of the wall defines a cylinder extending along an axis at a second oblique angle with respect to the second surface.

The present invention also provides an orifice plate for a fuel injector. The fuel injector includes a passage that extends between an inlet and an outlet, a seat that is proximate the outlet, and a closure member that cooperates with the seat to permit and prevent a flow of fuel through the passage. The orifice plate includes a member and an orifice penetrating the member. The member includes first and second generally parallel surfaces. The first surface is adapted to generally confront the valve seat, and the second surface faces opposite the first surface. The orifice is defined by a wall that couples the first and second surfaces. The wall includes a first portion that is spaced from the first surface and a second portion that couples first portion to the second surface. The first portion of the wall extends from the first surface at a first oblique angle with respect to the first surface, and the first oblique angle varies so as to define an asymmetrical chamfer. And the second portion of the wall extends between the first portion and the second surface, and defines a cylinder that extends along an axis at a second oblique angle with respect to the second surface.

The present invention also provides a method of forming an orifice plate for a fuel injector. The orifice plate includes a member that has first and second generally parallel surfaces. The method includes forming a pilot hole penetrating the member, deforming the pilot hole proximate the first surface, and shaving the pilot hole that has been deformed. The pilot hole extends along a first axis that is generally perpendicular to the first and second generally parallel surfaces. The deforming provides an asymmetrical chamfer with respect to the first axis and defines a first portion of an orifice. The first portion is proximate the first surface. The shaving provides a cylinder that extends along a second axis that is oblique with respect to the second surface and that defines a second portion of the orifice. The second portion is proximate the second surface.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

Figure 1A:
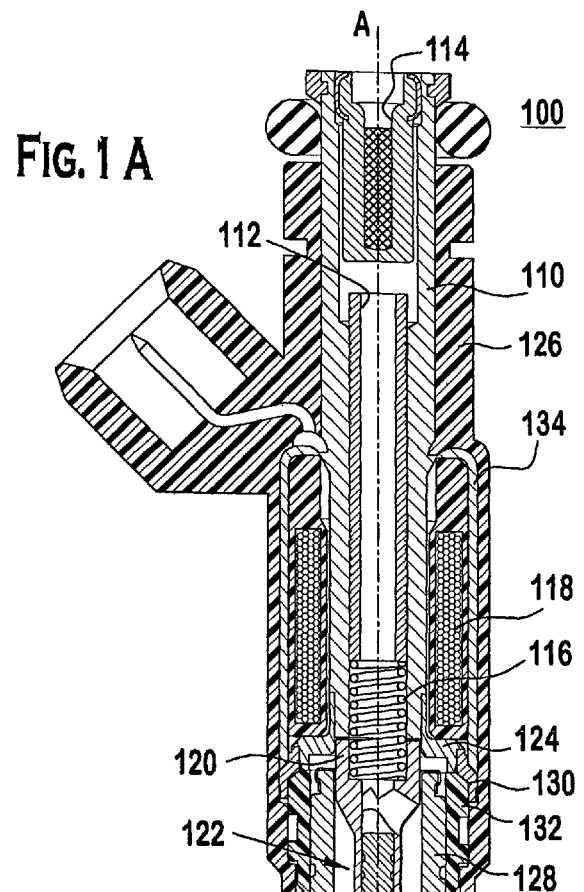
FIG. 1A is a cross-sectional view of a fuel injector according to a preferred embodiment.
Figure 2A:
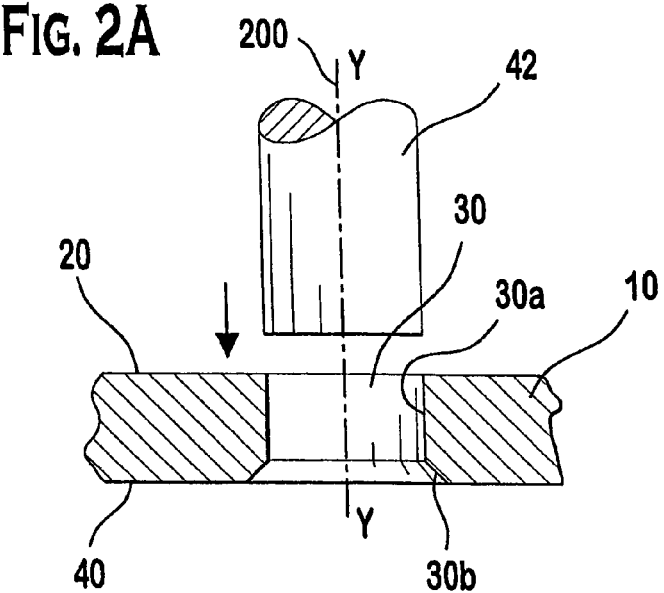
FIGS. 2A, 2B, 2C and 2D are fragmentary cross-sectional views of a thin disc orifice plate, and also serve to illustrate its method of manufacture, according to an example of the preferred embodiment of the present invention.
Figure 2B:
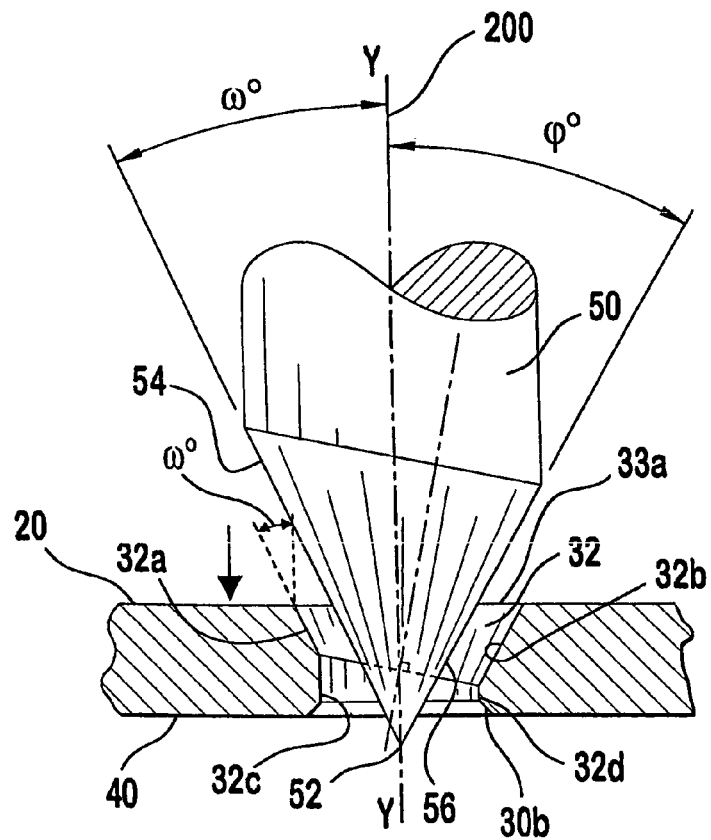
Figure 2C:
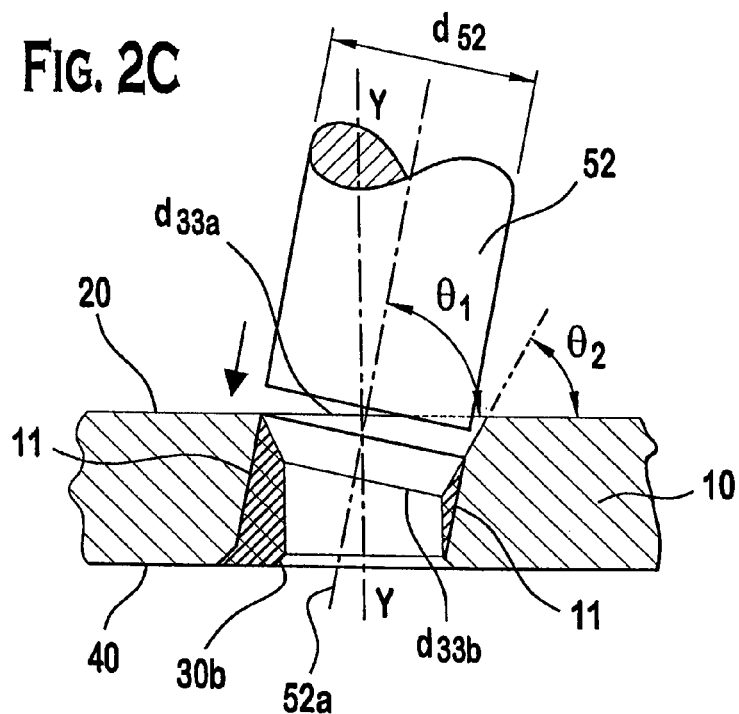
Figure 2D:
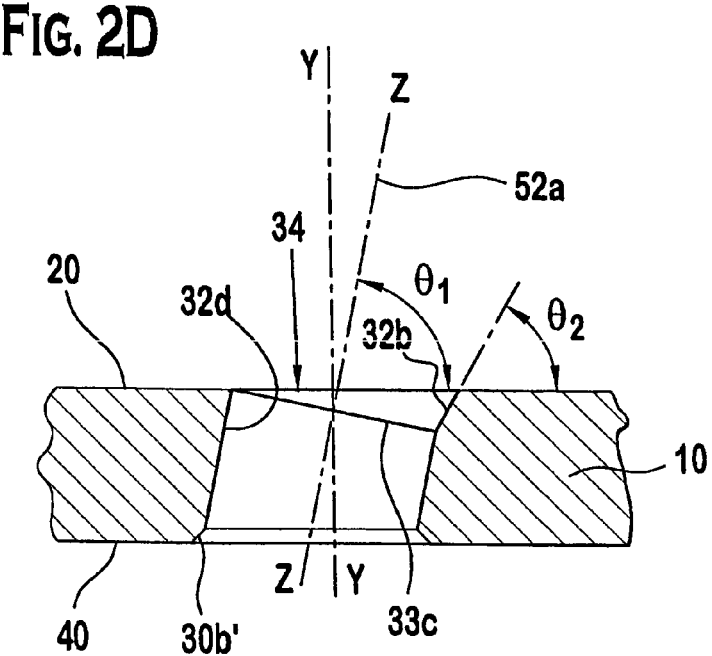
Figure 3:
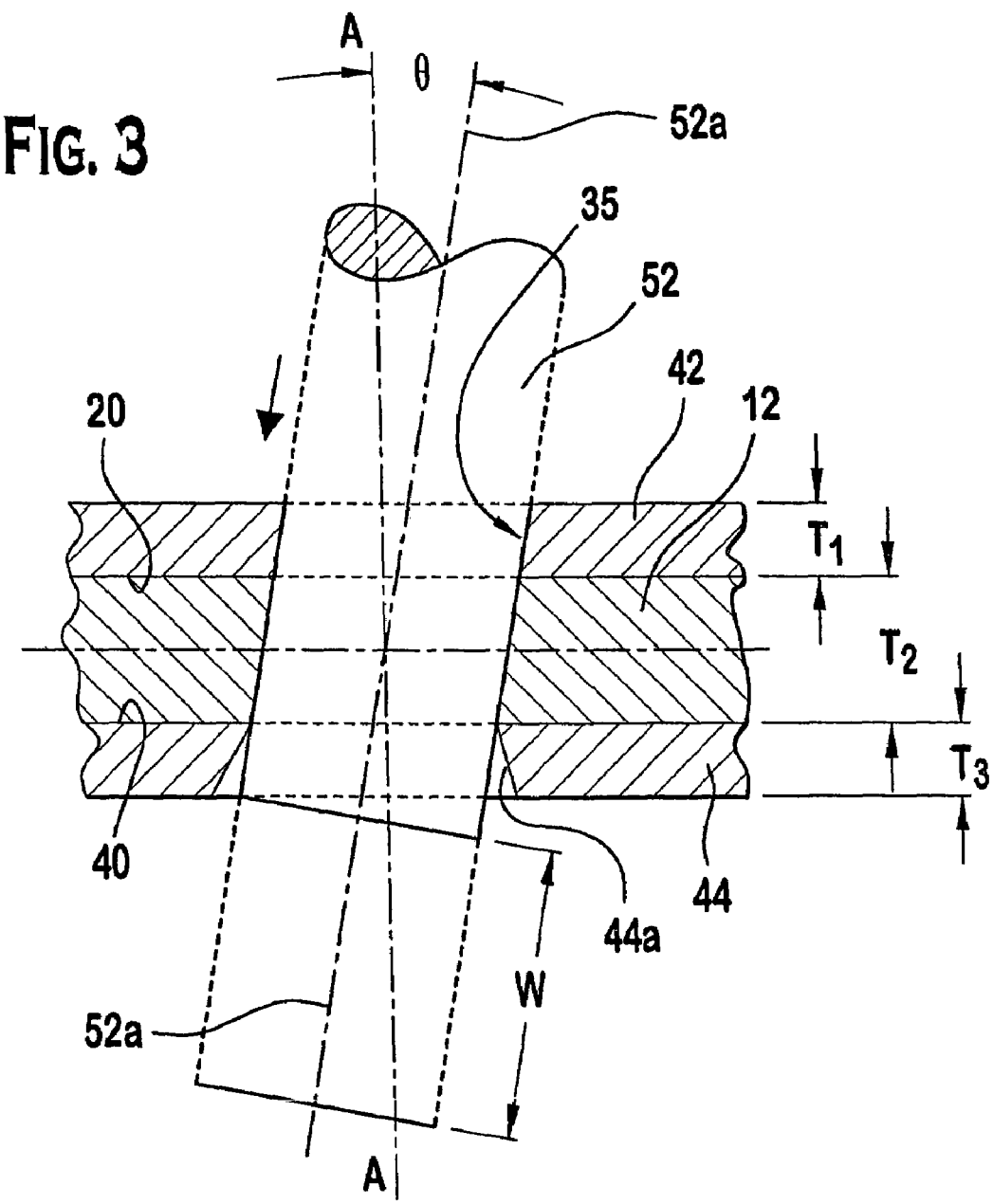
FIG. 3 is a fragmentary cross-sectional view of a thin disc orifice plate, and also serves to illustrate its method of manufacture, according to a second preferred embodiment of the present invention.

FIGS. 1-3 illustrate the preferred embodiments. In particular, as illustrated in FIG. 1A, a fuel injector 100 extends along longitudinal axis A-A and includes: a fuel inlet tube 110, an adjustment tube 112, a filter assembly 114, a coil assembly 118, a coil spring 116, an armature 120, a closure member assembly 122, a non-magnetic shell 124, a fuel injector overmold 126, a body 128, a body shell 130, a body shell overmold 132, a coil assembly housing 134, a guide member 136 for the closure member assembly 122, a seat 138, and a metering disc 140. The construction of fuel injector 100 can be of a type similar to those disclosed in U.S. Pat. Nos. 4,854,024; 5,174,505; and 6,520,421.

Figure 1B:
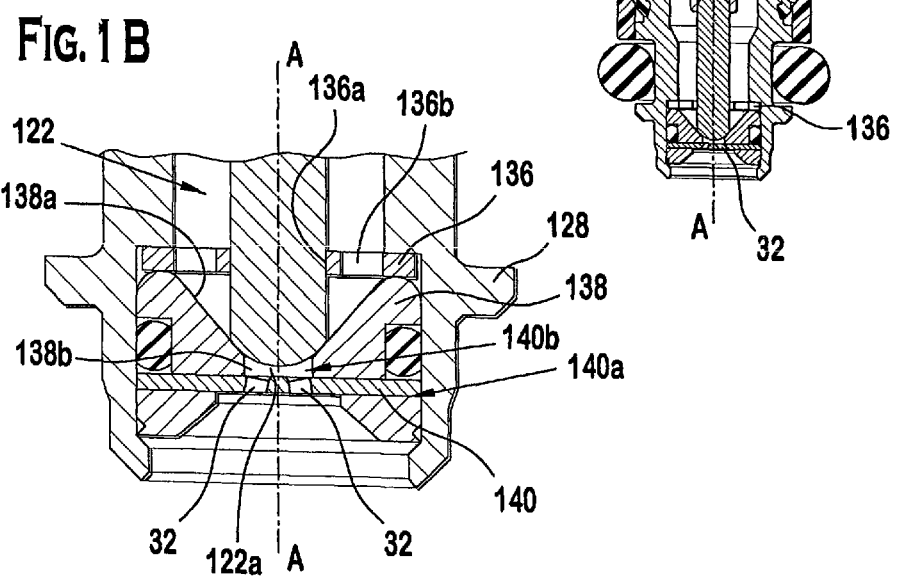
FIG. 1B is a cross-sectional view of a nozzle portion of a fuel injector of FIG. 1A.

FIG. 1B shows the nozzle end of a body 128 of a solenoid operated fuel injector 100 having a metering orifice disc 140 according to a preferred embodiment. The nozzle end of fuel injector 100 includes a guide member 136 and a seat 138, which are disposed axially interior of metering orifice disc 140. The guide member 136, seat 138 and disc 140 can be retained by a suitable technique such as, for example, forming a retaining lip with a retainer or by welding the disc 140 to the seat 138 and welding the seat 138 to the body 128.

Seat 138 can include a frustoconical seating surface 138a that leads from guide member 136 to a central passage 138b of the seat 138 that, in turn, leads to a central portion 140b of metering orifice disc 140. Guide member 136 includes a central guide opening 136a for guiding the axial reciprocation of a sealing end 122a of a closure member assembly 122 and several through-openings 136b distributed around opening 136a to provide for fuel to flow through sealing end 122a to the space around seat 138. FIG. 1B shows the hemispherical sealing end 122a of closure member assembly 122 seated on seat 138, thus preventing fuel flow through the fuel injector. When closure member assembly 122 is separated from the seat 138, fuel is permitted to pass thorough passage 138b, through orifices 32 extending through the metering orifice disc 140 such that fuel flows out of the fuel injector 100.

The metering orifice disc 140 can have a generally circular shape with a circular outer peripheral portion 140a that circumferentially bounds the central portion 140b that is disposed axially in the fuel injector. The central portion 140b of metering orifice disc 140 is imperforate except for the presence of one or more angled orifices 32 via which fuel passes through metering orifice disc 140. Any number of angled orifices 32 can be configured in a suitable array about the longitudinal axis A-A so that the metering orifice disc 140 can be used for its intended purpose in metering, atomizing and targeting fuel spray of a fuel injector. The preferred embodiments include four such through-angled orifices 32 arranged about the longitudinal axis A-A through the metering orifice disc 140.

Referencing FIGS. 2A, 2B, 2C, and 2D, a preferred embodiment of the metering orifice disc 140 can be formed as follows. Initially, a generally planar blank work piece 10 having a first surface 20 spaced at a distance from a second surface 40 without any orifices extending therethrough is provided. The blank 10 is penetrated by a suitable technique such as, for example, reaming, punching, coining, drilling or laser machining to form a pilot through-opening or orifice 30 that is symmetrical about and extending along a pilot tool axis Y-Y generally perpendicular to the planar surfaces 20 and 40 of the blank. Preferably, the symmetrical through-opening 30 is formed by a cylindrical punch 42 that forms a perpendicular wall section 30a between surface 20 and proximate the surface 40 with a break-out chamfer 30b proximate the surface 40.

The symmetrical pilot through opening or pilot orifice 30 is further penetrated by a suitable technique to form an asymmetrical through opening or orifice 32 having a longitudinal axis 200. The longitudinal axis 200 is preferably coincident and aligned with the tool axis Y-Y.

In a preferred embodiment, the asymmetrical through-orifice 32 is formed by a punch tool 50 having an apex 52 with at least two leading edges disposed about the pilot tool axis Y-Y such that the resulting cross-section of the punch tool 50 is asymmetrically disposed about the pilot tool axis Y-Y. Each of the at least two leading edges can include a first leading edge 54 and a second leading edge 56. The first leading edge 54 is oriented at a first lead angle $\omega°$ different from the second lead angle $\phi°$ of the second leading edge 56. Preferably, the first lead angle $\omega°$ ranges between approximately 20-25 degrees and the second lead angle $\omega°$ ranges between approximately 25-30 degrees. In one preferred embodiment, the first lead angle $\omega°$ is approximately 25 degrees and the second lead angle $\phi°$ is approximately 30 degrees.

Although the orifice 32 can be formed of a suitable cross-sectional area such as for example, square, rectangular, oval or circular, the preferred embodiments include generally circular orifices having a diameter of about 100 microns, and more particularly, about 160 microns. Preferably, the first and second surfaces of the metering orifice disc 140 are spaced apart over a distance of between about 75 to 300 microns, inclusive of the stated values thereof.

The asymmetrical orifice 32 can include a first entry chamfer 32a disposed at a first angular extension $\omega°$ about the pilot tool axis Y-Y and merging into a second entry chamfer 32b disposed at a second angular extension $\phi°$ (FIG. 2B). The first entry chamfer 32a can be oriented at approximately the first lead angle $\omega°$. The second entry chamfer 32b can be oriented at approximately the second lead angle $\phi°$ such that the first and second entry chamfers 32a and 32b are asymmetrical about the pilot tool axis Y-Y. The junctures of the first and second entry chamfers with respect to the surface 20 can form a first perimeter 33a symmetric to the longitudinal axis 200. The first perimeter 33a extends in over a plane generally perpendicular to the longitudinal axis 200. Preferably, the perimeter 33a is a generally elliptical perimeter.

The first and second entry chamfers 32a and 32b lead to a first wall surface 32c. The wall surface 32c is parallel to and disposed about the pilot tool axis Y-Y. The junctures of the first and second entry chamfers 32a and 32b with respect to the wall surface 32c can form a second perimeter 33b having a geometric center offset to the pilot tool axis Y-Y and aligned on a plane oblique to the first or second surfaces 20, 40 of the work piece 10 (FIG. 2B).

The asymmetrical orifice 32 is further processed in order to obtain an orifice 34 having its wall extending between the first surface 20 and the second surface 40 at generally an angle $\theta_1$ oblique to the surfaces 20, 40. The processing can be accomplished by a suitable technique, such as, for example, reaming, drilling, laser machining, shaving, or punching. In a preferred embodiment, the asymmetrical orifice 32 is punch-formed with a cylindrical or straight punch 52 oriented at a punch angle $\theta_1$ (FIG. 2C, along an axis 52a of the straight punch 52) relative to the surface 20 such that the punch tends to remove material 11, i.e., to "shave" the wall surfaces of the orifice in FIG. 2B, resulting in a shaved asymmetrical orifice 34, illustrated in FIG. 2D. That is, the punch 52 shaves the wall surfaces of orifice 32 (FIG. 2B) to form a cylindrical wall surface 32d extending at the punch angle $\theta_1$ oblique to either the first or second surfaces 20 and 40. The angled orifice 34 also includes a chamfer portion 32b extending at a chamfer angle $\theta_2$ with respect to one of the first or second surfaces 20, 40. It is to be noted that chamfer angle $\theta_2$ preferably of the same magnitude as the second angular extension $\phi°$ of the punch tool 50 in FIG. 2B. The cylindrical wall surface 32d forms a third perimeter 33c that is disposed generally on a plane oblique to either the first or second surfaces 20 or 40. The perimeter 33c includes a new orifice axis Z-Z oriented generally oblique to the either of the surfaces 20, 40 or the original orifice axis 200 with break out chamfer 30b'. The punch angle $\theta_1$ and the chamfer angle $\theta_2$ can be a range of angles. Preferably, the punch angle $\theta_1$ can be at approximately 70 degrees and up to approximately 87 degrees with respect to the surface 20 (or between about 20 degrees to about 3 degrees when the axis Y-Y is used as a referential datum). Similarly, the chamfer angle $\theta_2$ can be at approximately 65 degrees to approximately 75 degrees with respect to the surface 20 (or between about 30 degrees to about 25 degrees when the axis Y-Y is used as a referential datum). Although a lower limit and an upper limit have been given for each of the angles, each of the angles can be at an angle lower than the lower limit or higher than the higher limit as long as the punch can extend through the first and second surfaces 20 and 40 when it is operated. The work piece 10 can be further processed by suitable work piece finishing techniques into a metering orifice disc 140 for use with the fuel injector 100.

The preferred embodiments are believed to allow an angled orifice 34 to be formed by punch tool 52 disposed at punch angle $\theta_1$ at a lower punching force, thereby reducing damage to the work piece 10 and to the punch tool 52. Because of the pilot orifice 30, it is believed that the punch tool can penetrate the work piece 10 without skipping or sliding across the surface 10. Furthermore, it is believed that the force applied to the punch tool in order to shave the asymmetric orifice 32 is less than what would normally be required for a punch tool to punch through a work piece 10 without the pilot orifice or asymmetric orifice 32.

It is noted that where the straight punch 52 has a diameter $d_{52}$ less than the entry diameter $d_{33a}$ of the asymmetrical orifice 32 on the surface 20 of the work piece 10, a chamfer 33c oriented generally normal to an axis 52a of the punch 52 can be provided. Where the straight punch 52 has a diameter at least equal to the entry diameter $d_{33a}$ of the first perimeter 33a, the chamfer 32b can be reduced or eliminated entirely. Preferably, the straight punch 52 has a diameter of approximately 254 microns and the entry diameter of the asymmetrical orifice 32 prior to shave punching is greater than approximately 254 microns. In yet another preferred embodiment, the straight or cylindrical shaped punch 52 has a diameter of approximately 500 microns and the entry diameter of the asymmetrical orifice 32 prior to shave punching is greater than approximately 500 microns. Preferably, the punch diameter $d_{52}$ can be approximately equal to or slightly larger than the diameter $d_{33b}$ of the second perimeter 33b.

In another preferred embodiment, an angled orifice 35 can be preferably formed with a straight punch 52 as follows. Initially, as shown in FIG. 3, a work piece 12 is coated on the first surface 20 and second surface 40 with a material having a lower tensile strength, i.e., a "softer" material 42 and 44 than the work piece. The softer material 42, 44 can be a material with a tensile strength of approximately 20% to 50% of the tensile strength of the work piece such that a range of ratio of the tensile strength of the work piece to the tensile strength of the softer material is between 5:1 to 2:1, inclusive therein. As used herein, the term "coated" denotes that the softer material can be mechanically, electrically, or chemically bonded to the first and second surfaces of the work piece so that the work piece 12 is laminated or sandwiched by the softer material 42. The softer material 42 or 44 allows the straight punch 52 to be retained by the softer material 42 or 44 as the punch penetrates into the softer material 42 or 44 at the punch angle $\theta$ relative to a longitudinal axis A-A of the fuel injector, thus allowing the softer material 42 to be a sacrificial coating during the punching process. Thus, the punch 52 can be oriented at the punch angle $\theta$ (as referenced to the longitudinal axis A-A) as it penetrates the work piece 12 without sliding or skipping across the surface 20 of the work piece 12. It is noted that the material 42 and 44 can be the same material or different materials as long as both materials 42 and 44 are softer than the work piece. It is noted that because of the multiple layers of materials, a break-out chamfer 44a is formed on the sacrificial material 44 instead of on the surface of the work piece 12 as in the first preferred embodiment. And preferably, the softer material can be copper with a thickness (T1 or T3) of at least approximately ⅔ that of the thickness of the work piece. In one preferred embodiment, the thickness (T1 or T3) of the copper coating on the surface 20 and 40 is approximately 50 microns with the work piece having a thickness (T2) of approximately 76 microns.

As the punch 52 extends through the work piece and the coated materials 42 and 44 in FIG. 3, the punch 52 protrudes over a distance W from the exit diameter of the orifice 35 to ensure that the punch adequately removes materials on the wall of the orifice 35 so as to render the orifice 35 sufficiently smooth for its intended purpose as a metering orifice. Preferably, the distance W can be at least equal to the diameter $d_{52}$ of the punch 52. Thereafter, the punch 52 is withdrawn and the coated softer material on the work piece can be removed by a suitable removal technique such as, for example, chemical removal, vibratory, grinding, and preferably stripping with a sharp edge tool moving along the surfaces 20 and 40 of the work piece 12. The work piece 12 can be further processed by suitable metal finishing techniques such that a metering orifice disc 140 with angled orifices can be obtained for use with the fuel injector 100.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What I claim is:

1. A fuel injector for metering, atomizing, and spray targeting fuel, the fuel injector comprising:
    a seat including a passage extending along a longitudinal axis;
    a movable member cooperating with the seat to permit and prevent a flow of fuel through the passage; and
    an orifice plate including:
        a member including first and second generally parallel surfaces, the first surface generally confront the valve seat, and the second surface facing opposite the first surface; and
        an orifice, having longitudinal axis, penetrating the member and being defined by a wall coupling the first and second surfaces, the wall including:

a first portion extending from the first surface, the first portion of the wall extending at a first oblique angle with respect to the first surface, the first oblique angle defining a chamfer asymmetrical about the longitudinal axis of the orifice; and a second portion extending between the first portion and the second surface, the second portion of the wall being in direct communication with the first portion and defining a cylinder extending along an axis at a second oblique angle with respect to the second surface, such that fuel which enters the first portion at the first surface can flow through the first portion directly into the second portion and exit the second portion at the second surface, a perimeter being defined by the cylinder as an abutment of the first and second portions, the perimeter lying in a plane that is oblique with respect to the first surface.

2. The fuel injector according to claim 1, wherein at least a portion of the perimeter is contiguous with the first surface.

3. The fuel injector according to claim 1, wherein the first oblique angle is within a range of oblique angles with respect to the orifice axis.

4. The fuel injector according to claim 3, wherein the first oblique angle is in a first range between 25 to 30 degrees relative to the longitudinal axis and the second oblique angle is in a second range between 3 and 10 degrees relative to the longitudinal axis.

5. An orifice plate for a fuel injector including a passage extending between an inlet and an outlet, and a seat proximate the outlet and cooperating with a closure member to permit and prevent a flow of fuel through the passage, the orifice plate comprising:

a member including first and second generally parallel surfaces, the first surface being adapted to generally confront the valve seat, and the second surface facing opposite the first surface; and an orifice, having longitudinal axis, penetrating the member and being defined by a wall coupling the first and second surfaces, the wall including:

a first portion extending from the first surface, the first portion of the wall extending at a first oblique angle with respect to the first surface, the first oblique angle defining a chamfer asymmetrical about the longitudinal axis of the orifice; and a second portion extending between the first portion and the second surface, the second portion of the wall being in direct communication with the first portion and defining a cylinder extending along an axis at a second oblique angle with respect to the second surface, such that fuel which enters the first portion at the first surface can flow through the first portion directly into the second portion and exit the second portion at the second surface, a perimeter being defined by the cylinder as an abutment of the first and second portions, the perimeter lying in a plane that is oblique with respect to the first surface.

6. The orifice plate according to claim 5, wherein at least a portion of the perimeter is contiguous with the first surface.

7. The orifice plate according to claim 5, wherein the first oblique angle is within a range of oblique angles with respect to the orifice axis.

8. The orifice plate according to claim7, wherein the first oblique angle is in a first range between 25 to 30 degrees relative to the longitudinal axis, and the second oblique angle is in a second range between 3 and 10 degrees relative to the longitudinal axis.

* * * * *